(12) United States Patent
Park et al.

(10) Patent No.: US 12,157,380 B2
(45) Date of Patent: Dec. 3, 2024

(54) CHARGING CONNECTOR FOR VEHICLE

(71) Applicant: YURA CO., LTD., Hwaseong-si (KR)

(72) Inventors: Soo Hwan Park, Incheon (KR); Jai Ho Lee, Gyeonggi-do (KR)

(73) Assignees: YURA CO., LTD., Hwaseong-si (KR); YURA CORPORATION CO.,LTD., Seongnam-si (KR)

( * ) Notice: Subject to any disclaimer, the term of this patent is extended or adjusted under 35 U.S.C. 154(b) by 244 days.

(21) Appl. No.: 17/744,234

(22) Filed: May 13, 2022

(65) Prior Publication Data

US 2022/0371458 A1  Nov. 24, 2022

(30) Foreign Application Priority Data

May 24, 2021  (KR) .......... 10-2021-0066389

(51) Int. Cl.
| | |
|---|---|
| *H01R 13/05* | (2006.01) |
| *B60L 53/16* | (2019.01) |
| *H01R 13/44* | (2006.01) |
| *H01R 24/68* | (2011.01) |

(52) U.S. Cl.
CPC .......... *B60L 53/16* (2019.02); *H01R 13/052* (2013.01); *H01R 13/44* (2013.01); *H01R 24/68* (2013.01); *H01R 2201/26* (2013.01)

(58) Field of Classification Search
CPC .................... H01R 2201/26; H01R 13/629
See application file for complete search history.

(56) References Cited

U.S. PATENT DOCUMENTS

| | | | |
|---|---|---|---|
| 8,678,867 B2* | 3/2014 | Glick | H01R 13/111 439/843 |
| 9,680,247 B1* | 6/2017 | Glick | B60L 53/16 |
| 2013/0017739 A1* | 1/2013 | Glick | H01R 13/187 439/842 |
| 2018/0269627 A1* | 9/2018 | Miwa | H01R 13/639 |
| 2021/0086632 A1* | 3/2021 | Dupont | B60L 53/16 |
| 2021/0242620 A1* | 8/2021 | Saito | H01R 13/4361 |
| 2024/0078911 A1* | 3/2024 | Balasubramanian | G08G 1/22 |

* cited by examiner

*Primary Examiner* — Truc T Nguyen
(74) *Attorney, Agent, or Firm* — KILE PARK REED & HOUTTEMAN PLLC

(57) ABSTRACT

Provided is a charging connector for a vehicle including a main body provided with a charging part, a female terminal part installed inside the charging part so as to be electrically connected to an external changer, and a female housing configured to accommodate the female terminal part. The female terminal part includes a plurality of female terminals configured to electrically connect the external charger to a battery of the vehicle and a protection cap disposed outside one side of each of the female terminals to protect the female terminals. Therefore, damage of the female terminals are minimized to provide more improved electrical stability and reliability.

2 Claims, 5 Drawing Sheets

CHARGING CONNECTOR FOR VEHICLE

CROSS-REFERENCE TO RELATED APPLICATIONS

This U.S. non-provisional patent application claims priority under 35 U.S.C. § 119 of Korean Patent Application No. 10-2021-0066389, filed on May 24, 2021, the entire contents of which are hereby incorporated by reference.

FIELD OF THE INVENTION

The present invention disclosed herein relates to a charging connector for a vehicle, and more particularly, to a charging connector for a vehicle, which is used when an electric vehicle is charged.

BACKGROUND ART

Recently, as environmental problems have become an issue, eco-friendly vehicles have been greatly emphasized to save energy and prevent environmental pollution. Thus, hydrogen fuel cell vehicles, biodiesel vehicles, and electric vehicles come into the spotlight as replacements for vehicles that receive driving power through an existing internal combustion engine.

Among them, the vehicle with the most active technology development means an electric vehicle, i.e., a vehicle using electricity as driving force. The electric vehicle is classified into an electric vehicles (EV), a plug-in hybrid electric vehicles (PHEV), and a hybrid electric vehicles (HEV) according to a method of using electric energy and a rate at which electricity is used as driving force, and each of the EV and PHEV is provided with a fast charging part and a slow charging part to receive power from the outside. Here, a charging part and a connector provided with a terminal therein are installed for electrical connection of a charger.

Here, in the charging part and the charging connector for the vehicle, which is provided in the charger, there is a limitation in that terminals are damaged due to repeated detachment. Particularly, there is a limitation in that a plurality of male terminals are integrally inserted into a plurality of female terminals to cause an interference between some of the female terminals and some of the male terminals, and thus, the females are damaged.

In addition, there is a limitation in that electrical stability during the charging is deteriorated due to the damage of the terminal part at which a high voltage is generated.

SUMMARY OF THE INVENTION

To solve the above-mentioned limitations, the present invention provides a charging connector for a vehicle, in which a female terminal installed in the charging connector for the vehicle is protected to improve electrical stability and quality.

The present invention provides a charging connector for a vehicle, the charging connector including: a main body provided with a charging part; a female terminal part installed inside the charging part so as to be electrically connected to an external changer; and a female housing configured to accommodate the female terminal part, wherein the female terminal part includes: a plurality of female terminals configured to electrically connect the external charger to a battery of the vehicle; and a protection cap disposed outside one side of each of the female terminals to protect the female terminals.

Each of the female terminals may include: a contact part electrically connected to a male terminal inside the external charger; and a connection part electrically connected to the battery of the vehicle through a wire, and the protection cap may include: a first through-hole defined in an extension direction to surround the contact part; a second through-hole extending to the inside of the first through-hole; and a protection rib disposed outside a distal end of the contact part.

The contact part may include a plurality of contact ribs cut to define a third through-hole communicating with the second through-hole and have a guide surface that is inclined inward so that a cross-sectional area of a distal end of each of the contact ribs is gradually narrowed forward.

The charging part may include a fourth through-hole communicating with the second and third through-holes and have a plurality of charging spaces, in which the contact parts are installed, respectively, so that the plurality of female terminals have a certain pattern, and the protection rib may be disposed between the charging space and the contact part, wherein the second through-hole may have a size greater than that of the third through-hole.

The protection rib may include: a first protection rib disposed between the distal end of the contact rib and the contact space to define the second through-hole; and a second protection rib bent and extending from the first protection rib in the extension direction and disposed inside the third through-hole.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF THE PREFERRED EMBODIMENTS

Hereinafter, specific embodiments of the present invention will be described in detail with reference to the accompanying drawings. However, detailed descriptions related to well-known functions or configurations will be ruled out in order not to unnecessarily obscure subject matters of the present invention.

In addition, for convenience of explanation, three axes are indicated in some of the drawings, an X-axis direction is defined as a radial direction, a Y-axis direction is defined as an extension direction, and a portion at which a charging part is disposed in the extension direction is defined as a front side, and an opposite direction is defined as a rear side.

In addition, here, a charging connector for a vehicle is defined as including both a charging inlet provided in a vehicle body and a charging outlet provided in an external charging device and electrically connected to the charging inlet. However, in order to avoid overlapping description, the following description will be based on the charging inlet, and the following description may be applied to the charging outlet as it is.

Figure 1:
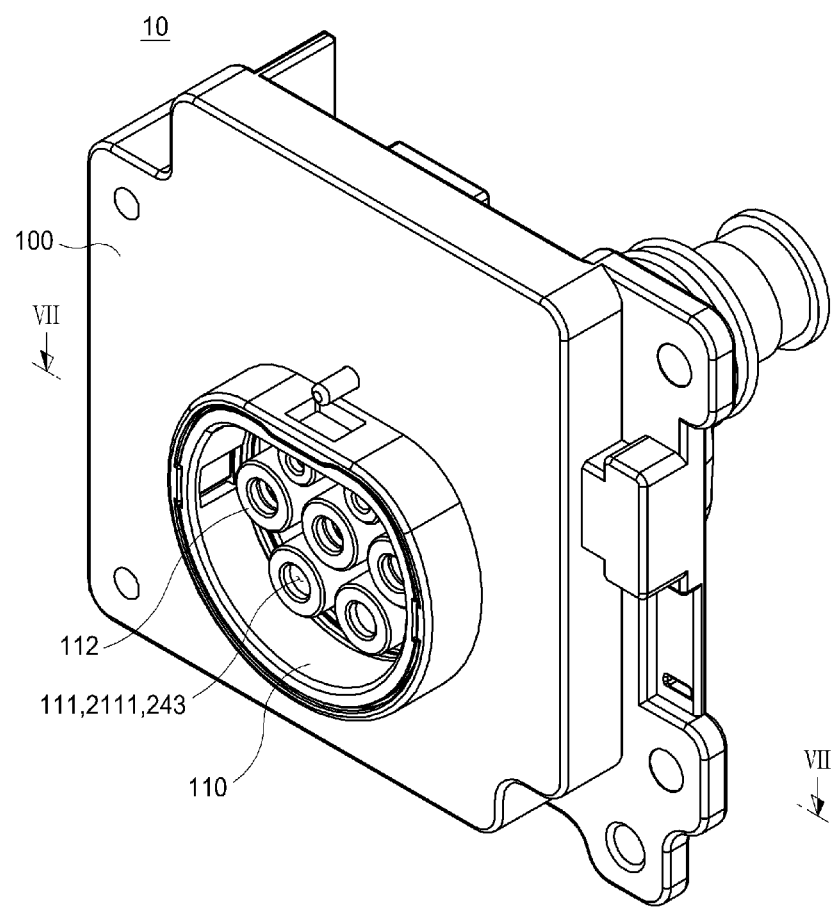
FIG. 1 is a perspective view of a charging connector for a vehicle according to an embodiment of the present invention.
Figure 2:
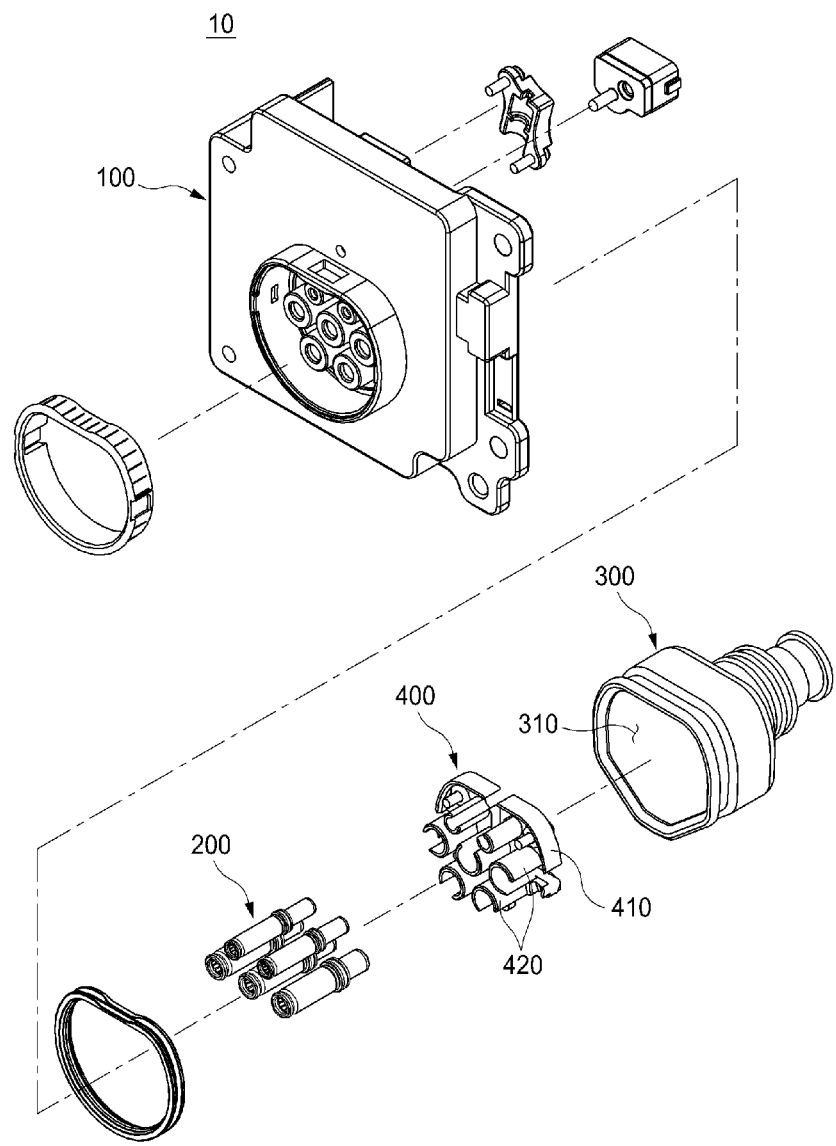
FIG. 2 is an exploded perspective view of FIG. 1.
Figure 3:
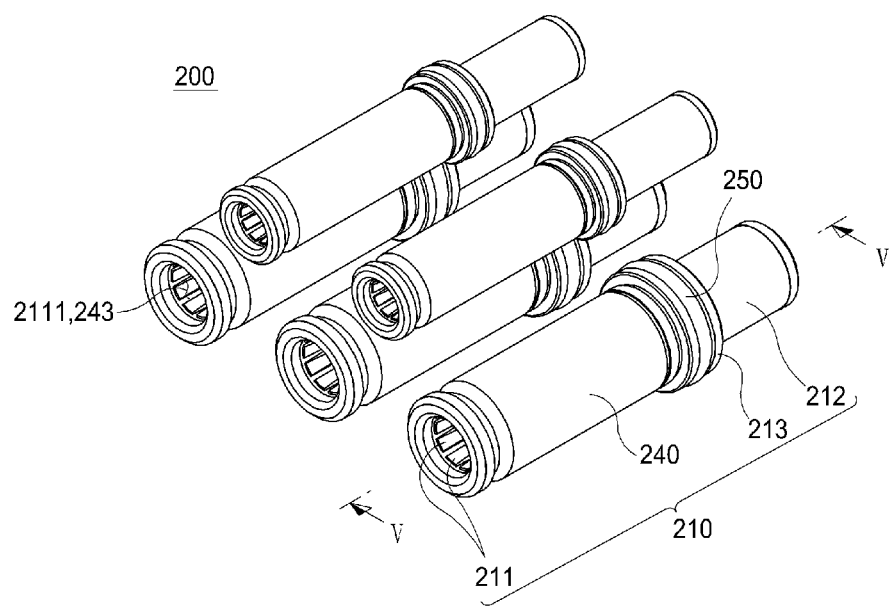
FIG. 3 is a perspective view of a female terminal part of FIG. 2.
Figure 4:
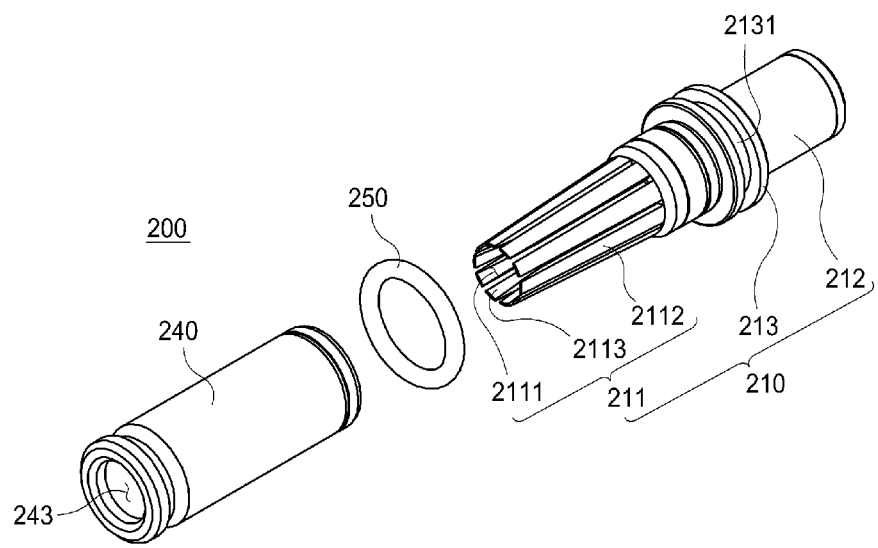
FIG. 4 is an exploded perspective view of FIG. 3.
Figure 5:
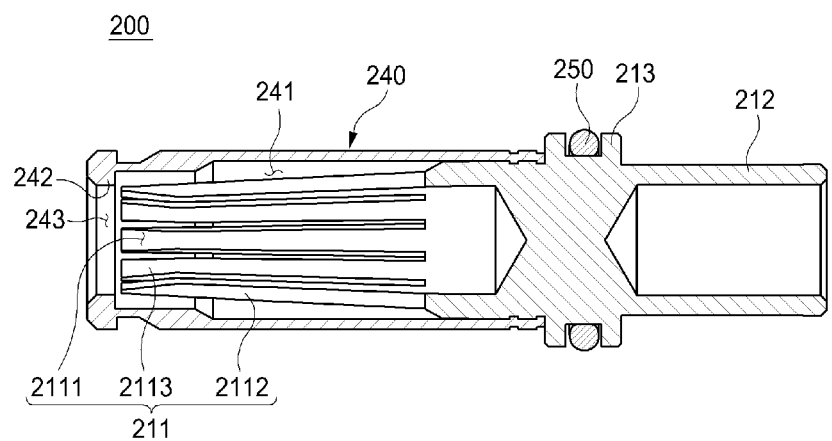
FIG. 5 is a cross-sectional view taken in a direction V-V of FIG. 3.
Figure 6:
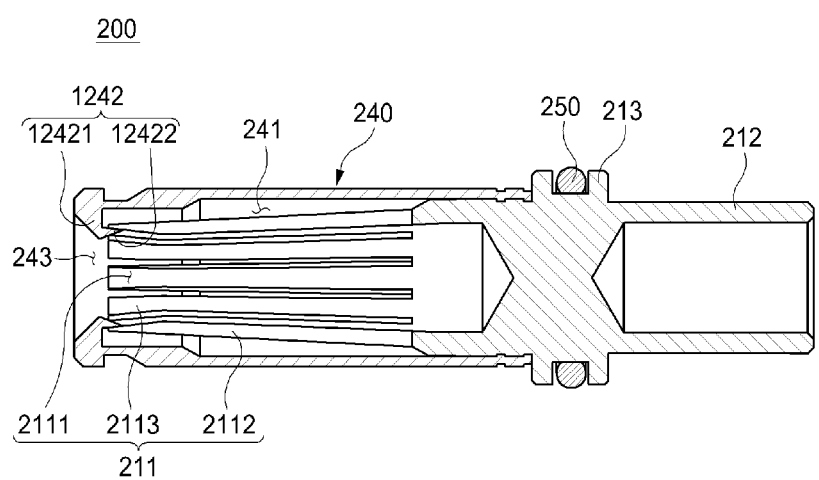
FIG. 6 is a view illustrating a state in which a protection cap is applied according to another embodiment.
Figure 7:
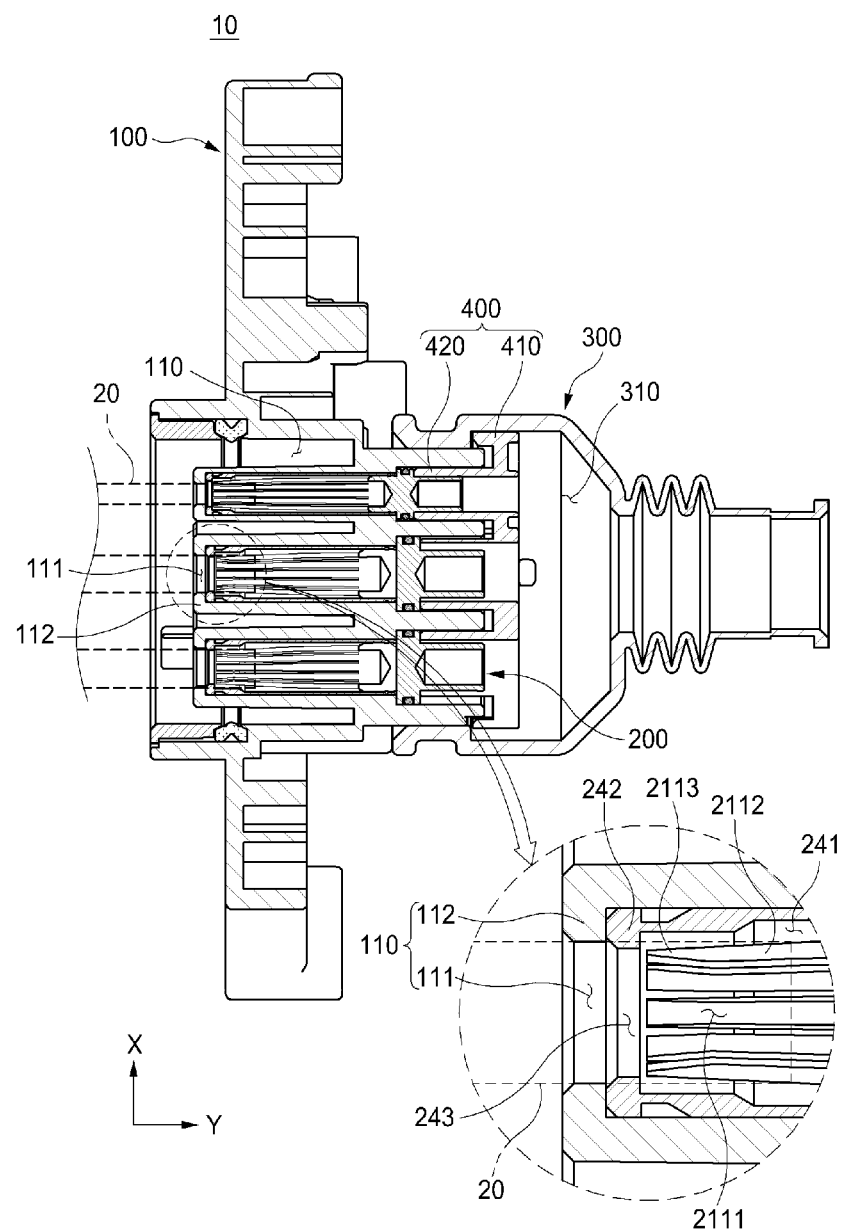
FIG. 7 is a view illustrating a state in which a male terminal is partially coupled in the cross-sectional view in a direction VII-VII of FIG. 1.

FIG. 1 is a perspective view of a charging connector for a vehicle according to an embodiment of the present invention, FIG. 2 is an exploded perspective view of FIG. 1, FIG. 3 is a perspective view of a female terminal part of FIG. 2, FIG. 4 is an exploded perspective view of FIG. 3, FIG. 5 is a cross-sectional view taken in a direction V-V of FIG. 3, FIG. 6 is a view illustrating a state in which a protection cap is applied according to another embodiment, and FIG. 7 is a view illustrating a state in which a male terminal is partially coupled in the cross-sectional view in a direction VII-VII of FIG. 1.

Referring to FIGS. 1 to 7, a charging connector 10 for a vehicle includes a main body 100 in which a charging part 110 is provided, a female terminal part 200 installed inside the charging part 110 and electrically connected to an external charger, and a female housing 300 accommodating the female terminal part 200. The female terminal part 200 includes a plurality of female terminals 210 electrically connecting the external charger to a battery of the vehicle and a protection cap 240 disposed outside one side of each of female terminals 210 to protect the female terminal 210.

Here, the charging connector 10 for the vehicle is defined to include both a charging outlet provided in the external charger when charging the vehicle and a charging inlet installed at one side of the vehicle so that the charging outlet is coupled thereto. In other words, the charging connector 10 is configured to electrically connect the charger to the battery, and the female terminal part 200 or the male terminal 20 may be installed in the charging connector 10.

Thus, a high voltage is generated in the female terminal 210 and the male terminal 20, and for stable charging, separation and damage of the female terminal 210 and the male terminal 20 may be minimized at their conventional positions even through the female terminal 210 and the male terminal 20 are repeatedly detached.

For this, the charging connector 10 for the vehicle according to the present invention is characterized in that a protection cap 240 is disposed outside the female terminal part 200 installed therein. Hereinafter, in the following description and drawings of the invention, the charging inlet will be described as a reference in order to avoid overlapping descriptions and use of the same drawings.

The main body 100 is installed so that one side thereof is exposed to the vehicle body, and the charging part 110 is disposed at exposed one side to provide a space to which the external charger is connected. Here, a plurality of charging spaces 112 having a fourth through-hole 111 defined therein may be defined inside the charging part 110 so that the plurality of female terminals 210 have a predetermined pattern. Thus, the plurality of male terminals 20 and the plurality of female terminals 210 may be integrally coupled to each other and designed according to a predetermined standard so that a user easily charges the battery.

Particularly, the recessed charging part 110 to which the external charger is coupled is disposed at one side of the main body 100, and the charging space 112 protruding from the charging part 110 in an extension direction Y is defined so that the plurality of female terminals 210 are disposed inside the charging part 110 in the predetermined pattern.

Here, the charging space 112 has the fourth through-hole in the extending direction Y so that the internal female terminal 210 of the charging space 112 and the male terminal 20 installed inside the external charger are electrically connected to each other.

The female terminal part 200 includes a plurality of female terminals 210 disposed in the charging space 112 from the other side of the main body 100, a protection cap 240 disposed outside the female terminal 210 to protect a contact part 211 that is in contact with the male terminal 20, and a coupling seal 250 coupled to one side of the female terminal 210 to allow the female terminal 210 to be stably installed in the charging space 112 and prevent moisture and impurities from being introduced.

In addition, the female terminal 210 includes a contact part 211 in which the charging space 112 is defined at one side thereof and having a third through-hole 2111 to be in contact with the male terminal 20 so as to be electrically connected, a connection part 212 connected to the battery of the vehicle through a wire at the other side thereof, and a coupling end 213 protruding in a radial direction X between the contact part 211 and the connection part 212 to guide the female terminal 210 to a position in the charging space 112 in the extension direction Y and having a seating groove 2131, in which the coupling seal 250 is seated, along an outer circumferential surface. Thus, the female terminal 210 is more stably connected to the male terminal 20.

Specifically, the contact part 211 is cut in the extension direction Y to provide a plurality of contact ribs 2112 so as to be stably coupled to the male terminal 20. Here, the plurality of contact ribs 2112 are spaced apart from each other in the radial direction X with respect to a central axis of the female terminal 210 to define the third through-hole 2111, into which the male terminal 20 is inserted, and an inner surface of a distal end of each of the contact ribs 2112 has a guide surface 2113 that is inclined to be gradually reduced in cross-sectional area forward to minimize an interference between the male terminal 20, which is inserted forward, and the contact rib 2112.

In other words, the third through-hole 2111 defined by the plurality of contact ribs 2112 has the widest area at the front side thereof and has an area gradually decreasing backward and also has the same area at a certain distance or more in the extension direction Y Thus, when the plurality of male terminals 20 and the plurality of female terminals 210 are integrally coupled to each other, the interference therebetween may be prevented to improve user's convenience and prevent the female terminals 210 from being damaged, thereby improving product durability.

The connection part 212 is connected to the wire that is electrically connected to the battery of the vehicle to transmit power supplied from the contact part 211 to the battery through the wire and is disposed in the accommodation space 310 defined in the female housing 300 so that the wires connected to the plurality of connection parts 212 are gathered in one direction and connected to the battery without interfering peripheral components.

The coupling end 213 protrudes in the radial direction X between the contact part 211 and the connection part 212, and in a state in which the female terminal part 200 is installed in the charging part 110, the coupling end 213 is in close contact with the outside of the charging space 112 to guide the position of the female terminal 210 in the extension direction Y so that the male terminal 20 and the female terminal 210 are in contact with each other at a pre-designed position to secure electrical stability.

In addition, the seating groove 2131, in which the coupling seal 250 is seated, is recessed along an outer circumferential surface thereof to prevent the impurities such as moisture from being introduced into the vehicle body through a gap defined between the plurality of charging parts 110 and the charging space 112, thereby providing more stable electrical connection.

The protection cap 240 is disposed outside the contact part 211 to prevent the contact part 211 from being damaged by repetitive attachment and detachment of the external charger for charging the vehicle and also prevent the female terminal 210 from moving in the extension direction Y, thereby providing stable electrical connection with the male terminal 20.

Thus, the protection cap 240 has a first through-hole 241 that is penetrated in the extension direction Y so that the contact part 211 is disposed therein, and in order to prevent the damage and the movement of the female terminal 210, the protection rib 242 extending to the inside of the first through-hole 241 and disposed in front of a distal end of the contact rib 2112 is disposed on a front distal end of the protection cap 240.

In other words, the protection cap 240 has the first through-hole 241, in which the contact part 211 is accommodated, extends from the front distal end of the first through-hole 241 in the radial direction X to define a second through-hole defined by the protection rib 242 disposed between the charging space 112 and the contact rib 2112, and are disposed in front of the plurality of contact ribs 2112 defined to be cut without interfering with the electrical contact between the male terminal 20 and the female terminal 210 to minimize the damage of the female 210, which occurs when the male terminal 20 is inserted.

Referring to FIG. 6, a protection cap 240 according to another embodiment of the present invention is the same as the protection cap according to the foregoing embodiment in that a first through-hole 241 is defined so that the female terminal 210 is disposed, and a protection rib 1242 is disposed in front of the contact rib 2112 so that a second through-hole 243 having an area less than that of the first through-hole 241. However, the protection rib 1242 includes a first protection rib 12421 extending from the front distal end of the protection cap 240 in the radial direction X to define the second through-hole 243 and a second protection rib 12422 bent at a distal end of the first protection rib 12421 to extend to the inside of the contact part 211 in the extension direction Y, thereby fundamentally preventing the interference between the male terminal 20 and the female terminal 210.

However, the second protection rib 12422 may cause the interference when the male terminal 20 is inserted, and thus, for the stable electrical connection, a cross-sectional area of the second protection rib 12422 may be gradually narrowed backward and have various shapes according to the design.

Thus, the charging connector 10 for the vehicle according to the present invention is provided with the protection caps 240 and 1240, which protect the contact part 211 of the female terminal 210 that is in contact with the male terminal 20, to provide more improved electrical stability and reduce the possibility of the damage, thereby improving the product durability.

The female housing 300 is coupled to a rear side of the female terminal part 200, and an accommodation space 310, in which the connection part 212 is accommodated, is defined to protect portions, at which the plurality of wires and the connection part 212 are connected to each other, from the outside and guide the plurality of wires to extend in one direction so that the battery is easily connected, and prevent the interference with peripheral components.

Here, the accommodation space 310 also accommodates a rear holder coupled to the rear of the female terminal part 200 to additionally fix the female terminal 210 and accommodates an extension rib extending to the other side of the main body 100 to prevent the high voltage generated when the vehicle is charged from causing short circuit with the peripheral components.

The rear holder 400 includes a holder body 410 disposed at the other side of the main body 100 and a support rib 420 extending from the holder body 410 in the extension direction so as to be in close contact with a rear side of the coupling end 213 of the female terminal 210 inserted in the charging space 112, thereby additionally fixing the plurality of female terminals 210 coupled to the charging part 110 and improving the worker's workability during the production and also more stably fixing the female terminal 210.

In other words, the female terminal 210 is primarily fixed by the coupling end 213 disposed outside the rear side of the charging space 112 and then is secondarily fixed again by the support rib 420 disposed behind the coupling end 213 to minimize the movement in the extension direction Y and maintain an initial position even when the external charger is repeatedly detached, thereby providing more improved stability and reliability.

Therefore, the charging connector 10 for the vehicle according to the present invention provides the protection caps 240 and 1240 disposed outside the contact part 211 to minimize the damage of the female terminal 210 by continuous vibration and external force due to the operation of the vehicle and also provide more firm durability even though the external charger for charging the vehicle is repeatedly detached, thereby significantly improving the user's stability and product reliability.

As described above, various effects including the following facts may be expected according to the technical problems of the present invention. However, the present invention is unnecessary to allow all of the following effects to be exerted.

The charging connector for the vehicle may be provided with the protection cap disposed outside the contact part of each of the female terminals to minimize the damage of the female terminals, which occurs when integrally coupled to the plurality of male terminals, and the protection rib may be disposed between the charging space and the contact part to minimize the movement of the female terminals in the extension direction, thereby improving the electrical stability and reliability.

In addition, the coupling seal that is in close contact with the charging space may be disposed outside the protection cap to primarily fix the female terminal part, thereby reducing the worker's fatigue during the production and also to prevent the moisture and the impurities from being introduced into the charging connector for the vehicle, thereby improving the product durability.

In addition, the contact part may be cut to provide the plurality of contact ribs, and the inclined guide surface may be disposed on the inner surface of each of the contact ribs so that the cross-sectional area of each of the contact ribs is gradually reduced forward. Thus, the interference occurring when the male terminal is inserted may be prevented, and also, the initial insertion/extraction force may be reduced to improve the user's convenience.

In the above, preferred embodiments of the present invention have been exemplarily described, but the scope of the present invention is not limited to such specific embodi-

What is claimed is:

1. A charging connector for a vehicle, comprising:
a main body provided with a charging part;
a female terminal part installed inside the charging part so as to be electrically connected to an external changer; and
a female housing configured to accommodate the female terminal part,
wherein the female terminal part comprises:
a plurality of female terminals configured to electrically connect the external charger to a battery of the vehicle; and
a protection cap disposed outside one side of each of the female terminals to protect the female terminals, wherein
each of the female terminals comprises:
a contact part electrically connected to a male terminal inside the external charger; and
a connection part electrically connected to the battery of the vehicle through a wire,
the protection cap comprises;
a first through-hole defined in an extension direction to surround the contact part;
a second through-hole extending to the inside of the first through-hole; and
a protection rib disposed outside a distal end of the contact part,
the contact part comprises a plurality of contact ribs cut to define a third through-hole communicating with the second through-hole and has a guide surface that is inclined inward so that a cross-sectional area of a distal end of each of the contact ribs is gradually narrowed forward, and
the protection rib comprises
a first protection rib disposed outside a distal end of the contact rib to define the second through-hole; and
a second protection rib extending from the first protection rib in the extension direction and disposed inside the third through-hole,
the second protection rib is bent to protrude inside the second through-hole.

2. The charging connector of claim 1, wherein the charging part comprises a fourth through-hole communicating with the second and third through-holes and has a plurality of charging spaces, in which the contact parts are installed, respectively, so that the plurality of female terminals have a certain pattern, and
the protection rib is disposed between the charging space and the contact part,
wherein the second through-hole has a size greater than that of the third through-hole.

* * * * *